United States Patent
Bennett

(10) Patent No.: US 6,652,019 B1
(45) Date of Patent: Nov. 25, 2003

(54) CARGO TRAILER THIN WALL CONSTRUCTION

(75) Inventor: Jeffrey J. Bennett, City of Industry, CA (US)

(73) Assignee: Utility Trailer Manufacturing Company, City of Industry, CA (US)

(*) Notice: Subject to any disclaimer, the term of this patent is extended or adjusted under 35 U.S.C. 154(b) by 0 days.

(21) Appl. No.: 09/964,784

(22) Filed: Sep. 26, 2001

Related U.S. Application Data

(63) Continuation-in-part of application No. 09/813,729, filed on Mar. 21, 2001, now abandoned.

(51) Int. Cl.$^7$ .................. B60J 7/00; A60K 37/00; A60N 2/00; A60N 3/00; B60R 27/00
(52) U.S. Cl. ............. 296/181; 296/191; 296/39.1; 52/464; 52/395; 52/459
(58) Field of Search ................ 52/464, 461, 459, 52/395, 476, 468, 470, 471; 296/181, 183, 191, 39.1, 39.3, 29

(56) References Cited

U.S. PATENT DOCUMENTS

| | | | |
|---|---|---|---|
| 3,393,920 A | 7/1968 | Ehrlich | 280/106 |
| 4,106,252 A * | 8/1978 | Rutten | 52/762 |
| 4,470,231 A * | 9/1984 | Lewis | 52/204 |
| 4,685,721 A | 8/1987 | Banerjea | 296/181 |
| 4,781,004 A * | 11/1988 | Hartman | 52/464 |
| 4,810,027 A | 3/1989 | Ehrlich | 296/181 |
| 4,904,017 A | 2/1990 | Ehrlich | 296/181 |
| 4,940,279 A | 7/1990 | Abott et al. | 296/181 |
| 5,066,066 A | 11/1991 | Yurgevich et al. | 296/181 |
| 5,112,099 A | 5/1992 | Yurgevich et al. | 296/181 |
| 5,439,266 A | 8/1995 | Ehrlich | 296/181 |
| 5,584,527 A * | 12/1996 | Sitter | 52/395 |
| 5,997,076 A | 12/1999 | Ehrlich | 296/181 |
| 6,003,932 A | 12/1999 | Banerjea et al. | 296/181 |
| 6,220,651 B1 * | 4/2001 | Ehrlich | 296/181 |
| 6,497,451 B1 * | 12/2002 | Jones et al. | 296/181 |

FOREIGN PATENT DOCUMENTS

| | | | | |
|---|---|---|---|---|
| JP | 2-35157 | * | 2/1990 | E04D/3/366 |
| JP | 2-85455 | * | 3/1990 | E04D/13/15 |
| JP | 2-128051 | * | 5/1990 | E04D/3/366 |

* cited by examiner

*Primary Examiner*—Carl D. Friedman
*Assistant Examiner*—Chi Q. Nguyen

(57) ABSTRACT

A cargo trailer having thin walls wherein the thin walls consist of a plurality of adjacent overlapping outer plates, a plurality of regularly spaced thin posts and a plurality of thin liner panels between and overlapping the posts. The liner panels are u-shaped plates with flanges on each edge containing holes of equal or alternating diameters. When the liner panels have holes of alternating diameters, the liner panels are fastened to the thin posts and outer plates only by the fasteners in the smaller of the alternating diameter holes, such that the liner can be removed without disassembling the outer plate and post components of the wall. The horizontal distance between the holes in the liner panels is less than the horizontal distance between the holes in the outer plates resulting in the liner panel being stretched when assembled.

45 Claims, 3 Drawing Sheets

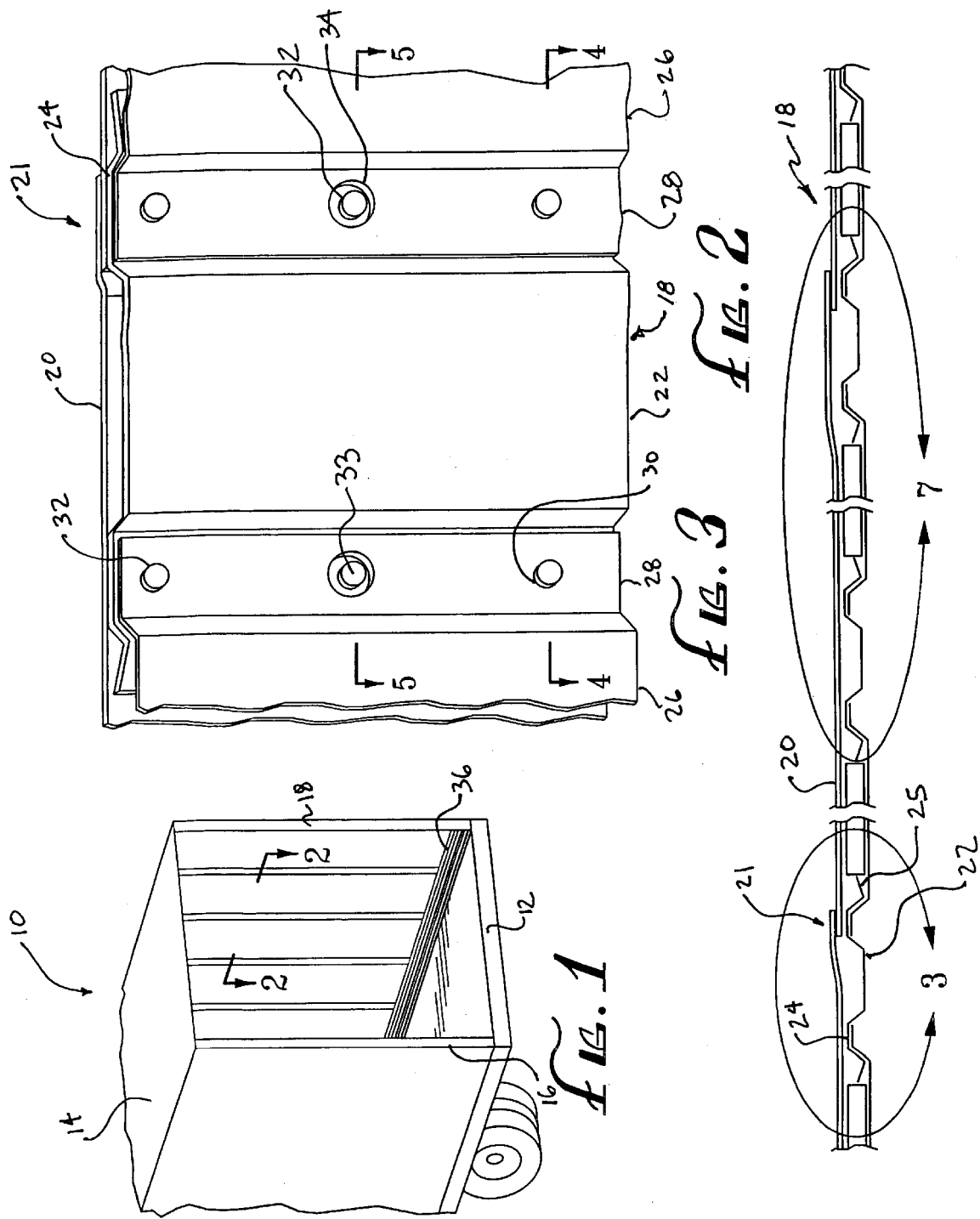

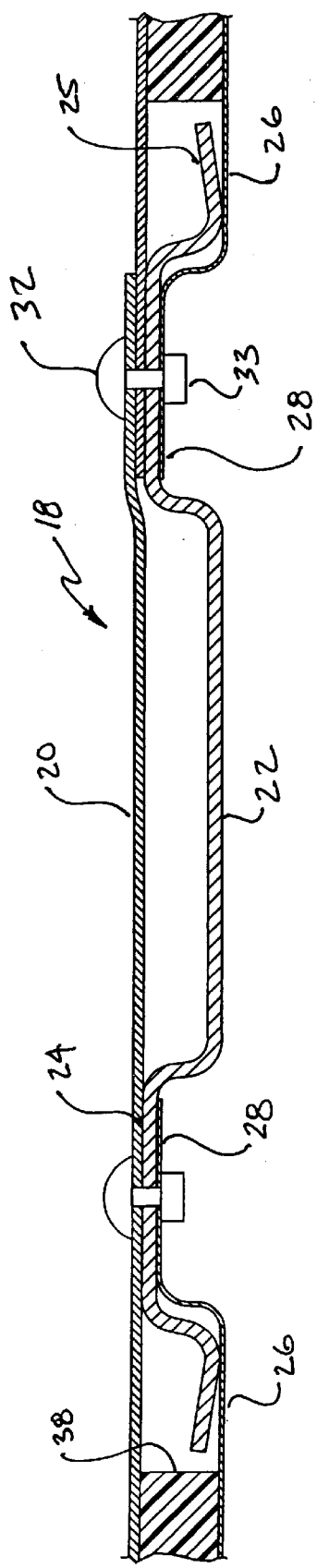
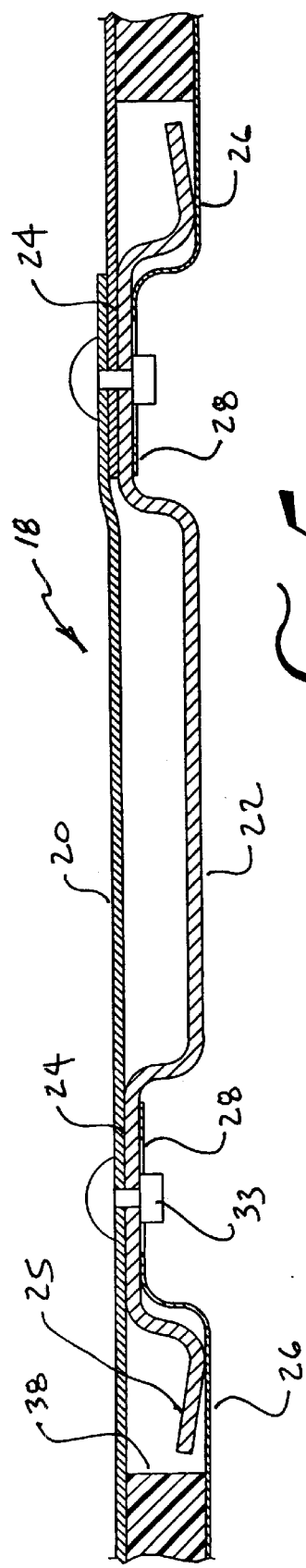

CARGO TRAILER THIN WALL CONSTRUCTION

This is a Continuation in Part of U.S. Ser. No. 09/813,729 filed Mar. 21, 2001, now abandoned.

FIELD OF THE INVENTION

This invention relates generally to the construction of a cargo trailer and more particularly to an improved construction of the side walls of the cargo trailers allowing for a thinner wall construction which results in maximizing the interior volume of the cargo trailer.

BACKGROUND OF THE INVENTION

There are many cargo trailers and other such containers that typically utilize rectangular panels placed adjacent to each other to form the side walls of the trailers, such as those disclosed in U.S. Pat. Nos. 5,439,266, 4,904,017, 4,810,027 and 6,003,932. The cargo trailers disclosed in those patents typically contain rectangular panels placed side by side with an additional plate or plates overlapping the adjacent plates to join the plates together.

Wall constructions of the type above have been utilized because of the regulations governing such vehicles. These regulations generally limit the overall width of the cargo trailer. The advantage of having the plates side by side with a thin plate to overlap the adjacent panels creates a thin wall that results in a maximum cargo volume. However, because of the size of these panels and the nature of the construction, the structural strength of these side walls is weakened.

The prior art has attempted to construct a thin wall trailer having a maximum cargo volume while maintaining the structural integrity of the walls. Some attempts have been made which eliminate structural posts by increasing the thickness of the panels to increase their integral strength. This results in a much more costly and difficult construction process because of the size of the panels required for these trailers. Other prior art has attempted to integrate the post into the joining plates so that the overall thickness of the wall remains as thin as possible. These wall constructions also have problems. The posts protrude outward of the trailer making them more prone to damage. There are also problems with maintaining the stiffness and structural strength required for the side walls.

The side wall construction of the trailers disclosed in the prior art have additional drawbacks. When these cargo trailers are loaded with cargo, typically a forklift is used to place the cargo in the trailer. Many times the forklift, while doing this, will hit the sides of the trailer causing damage to the sides of the trailer. Eventually, the damage becomes so extensive that the walls have to be replaced, resulting in demolition and reconstruction of the trailer which is very costly.

Additionally, the prior art has constructed thin walls with liners that are made of plastic that snap in between the posts of the wall. These liners, while protecting the side wall, offered no protection of the posts themselves. Other previous cargo trailers have been constructed with plywood liners to protect the posts. However, these plywood liners greatly reduce the interior volume of the trailer and reduce the amount of cargo that can be carried.

Thus there is a need for a cargo trailer side wall that is as thin as possible while still maintaining its structural strength and stiffness. There is also a need for a thin wall construction which protects the wall posts while still maintaining as thin a wall as possible in order to maximize the cargo volume of the trailer.

SUMMARY OF THE INVENTION

The present invention provides an improved construction of a thin wall for a cargo trailer that maintains its structural strength while at the same time protects the posts from damage. More specifically, the thin wall construction consists of adjacent overlapping outer plates, a plurality of regularly spaced thin posts and a plurality of liner panels between the thin posts.

The thin vertical posts are generally hat or u-shaped in cross-section and are preferably spaced about two feet on center. The posts also coincide with the overlapping joint between the adjacent outer plates. The thin posts contain flanges in which there are holes of equal diameter regularly spaced along the length of the flange. The outer plates also contain holes of equal diameter regularly spaced along the outer plates that coincide with the location of the holes in the flanges of the thin posts.

The liner panels are generally a more elongated hat or u-shaped in cross-section and also contain flanges along each edge. The flanges also contain holes along their length. The holes along the length of the flange can either be of alternating diameter such that every other hole is of a smaller diameter than the other intermediate hole or can be of equal diameter. The horizontal distance between the holes in the liner panels is preferably shorter than the horizontal distance between the holes in the outer plates.

Fasteners are used to connect the liner panels and thin posts to the adjacent outer plates. These fasteners, preferably rivets, are also used to join the adjacent outer plates together in the overlapping area of the plates.

The liner panels as they are connected to the posts and outer panels are stretched because the horizontal distance between the holes in the liner panels is shorter than the horizontal distance between the holes in the outer plates. This stretching of the liner panels prevents the liner panels from buckling and maintains a uniform interior distance between the side walls.

When constructed with alternating diameter holes along the flange of the liner panels, there is an advantage that is not present in other trailer constructions. Because the larger diameter holes are such that they are larger than the diameter of the rivet head, the rivet only engages the liner panel at every other hole in the flange. The advantage of this becomes apparent when the liner panel becomes damaged and needs to be replaced. Unlike other trailers where that entire damaged wall portion would need to be disassembled by removing all of the rivets, in the present invention only the engaging rivets are drilled out leaving the non-engaging rivets intact. The liner can then be replaced without having to disassemble and/or replace the entire wall of the trailer saving considerable time and cost in repairing the trailer.

The wall construction, however, can also have liner panels containing holes of equal diameter along the length of the flange. The liner panel thus is simpler to construct but still maintains the advantage of the thin wall construction while losing the advantage of the easy replacement of the liner panel.

Additionally, because the liner panels overlap the post flanges, the panels help to protect the post. The overlap forms a ramp which prevents cargo containers and forklifts from catching the post when the cargo is placed in the trailer resulting in less damage to the posts.

BRIEF DESCRIPTION OF THE DRAWINGS

FIG. 1 is a simplified perspective view showing a cargo trailer body incorporating features of the present invention;

FIG. 2 is a diagrammatic sectional plan view of the side wall of the cargo trailer taken along line 2—2 of FIG. 1;

FIG. 3 is an enlarged fragmentary view of a portion of the cargo trailer wall within circle 3 of FIG. 2;

FIG. 4 is a sectional plan view of the side wall of the cargo trailer taken along line 4—4 of FIG. 3;

FIG. 5 is a sectional plan view of the side wall of the cargo trailer taken along line 5—5 of FIG. 3.

DETAILED DESCRIPTION OF THE PREFERRED EMBODIMENTS

Figure 6:
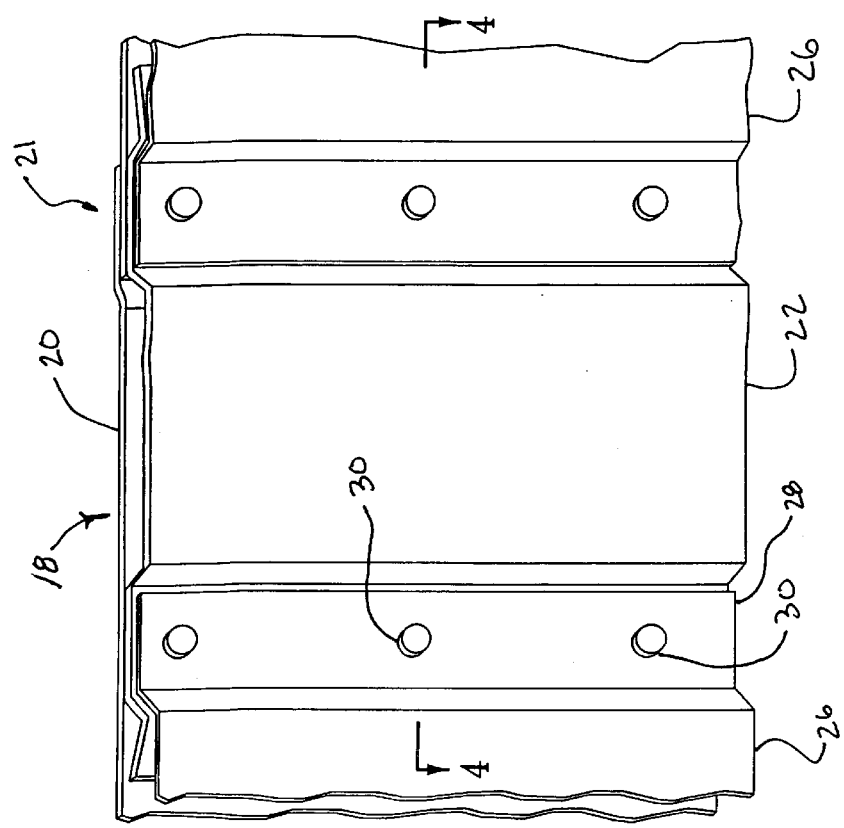
FIG. 6 is an enlarged fragmentary view of a portion of the cargo trailer wall similar to FIG. 3.

The preferred embodiment of the present invention will now be described with reference to the drawings. To facilitate the description, a reference numeral representing an element in one figure will represent the same element in any other figure.

Referring now to FIG. 1 in conjunction with FIGS. 2 and 3, the cargo trailer body 10 includes a floor 12, a roof 14 and a pair of side walls 16 and 18. Each of the side walls contains a plurality of generally flat rectangular outer plates 20 (best viewed in FIGS. 2 and 3) which contain a slight overlapping joint 21 between the adjacent outer plates 20. The outer plates 20 are generally made of lightweight metallic material such as aluminum. The plates 20 are approximately four feet wide in the preferred embodiment, creating an overlapping joint 21 every four feet along the length of the cargo trailer. Each plate may be completely flat or have one edge portion slightly bent outwardly so that it can overlap the previous plate creating an overlapping joint 21.

Referring now to FIG. 2, in conjunction with FIG. 3, a vertical post 22 is preferably placed along the plates every two feet on center in low stress areas of the trailer. In high stress areas of the trailer, such as at the front of the trailer and at the wheel location, the spacing of the thin posts 22 is preferably one foot on center. The thin post 22 is a generally a hat or u-shaped plate in cross-section with flanges 24 on each edge of the plate (best viewed in FIG. 4 and 5). The flanges 24 contain holes spaced along the length of the flange, preferably about every 2 inches. The holes are of equal diameter sized to match the diameter of the fastener 32 used to connect the thin posts 22 to the plates 20. The plates 20 will also contain holes corresponding to the location of the holes for the thin posts 22 so that the holes in the plates 20 and in the flanges 24 of the thin posts 22 are aligned. The flanges 24 of the thin posts 22 are bent at the edges into an s-shape so that this portion 25 of the flange protrudes laterally in the same direction as the thin posts 22. The plate for the thin posts 22 is generally made of 14 Ga. aluminum or other such lightweight material. However, the thickness of the thin posts 22 can be increased in order to strength the wall, if needed.

A liner panel 26 is generally rectangular and is bent into an elongated hat or u-shape in cross-section with flanges 28 on each edge of the panel 26. The liner panel 26 generally is preferably about 0.019 inches thick in low stress areas of the cargo trailer. In higher stress areas, such as the front of the trailer and at the wheel locations, the liner panel 26 can be preferably increased to 0.035 inches in thickness. The liner panel 26, however, can be of any thickness such that it is thicker in high stress areas than in low stress areas.

Referring now to FIG. 3, the liner panel flanges 28 contain holes 30 along the length of the flanges 28, preferably every two inches on center, to match the holes in post flanges 24. Holes 30 can either be of alternating diameter, as can clearly be seen in FIG. 3, or can be of equal diameter, as can clearly be seen in FIG. 6.

Referring first to FIG. 3, the holes 30 are of a diameter to receive a fastener 32 so that the wider end (head or tail) 33 of the fastener 32 is of a larger diameter than the hole 30. This can be more clearly seen in FIG. 4, which shows the end of the fastener 32 having a larger diameter than the hole 30 in the liner panel 26. In the preferred embodiment, the fasteners 32 used to assemble the thin walls are rivets. However, any other type of fastener could be used to assemble the thin walls. The holes 30 are sized to match the size of the fastener that is used.

Referring to FIGS. 3 and 5, the alternating holes 34 along the length of the flange 28 are of a larger diameter than the wide end 33 of the fastener 32 so that the fastener 32 does not engage with or secure the liner 26. The size of hole 34 is dependent on the type of fastener that is used. This hole 34 can be of any diameter such that it is larger than the diameter of the fastener used, which prevents the liner panel 26 from engaging with the fastener 32.

The advantage of having only every other hole along the flange 28 of the liner panel 26 engage with the fastener 32 is clear when the liner becomes damaged and needs to be replaced. In a typical wall construction, all of the fasteners used to construct the wall also engage the liner, if one is used. When the liner panel needs to be replaced, all of the fasteners need to be drilled out, which results in deconstruction of the entire damaged portion of the wall, both inside and out. In the present invention, because only every other fastener 32 engages the liner 26, when those fasteners 32 are drilled out to remove the liner 26, the other half of the fasteners 32 are left intact. The liner 26 can then be removed while the post 22 and plates 20 remain in place because the other half of the fasteners 32 are holding them in place.

Referring now to FIG. 6, the liner panel 26 can alternatively be constructed with the holes 30 of equal diameter along the entire length of the flange.

Figure 7:
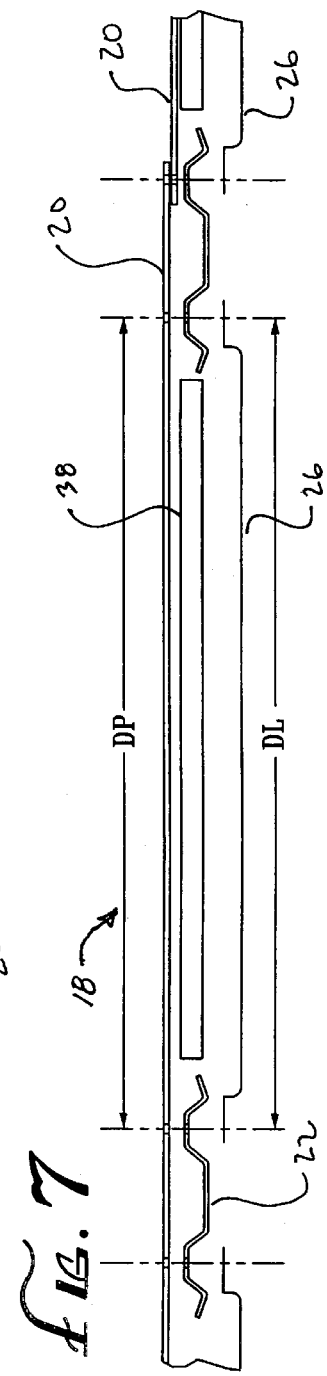
FIG. 7 is a diagrammatic and exploded sectional plan view of the components of the side wall of the cargo trailer of the present invention.

Referring now to FIG. 7, a diagrammatic and exploded sectional plan view of the components of the side wall of the cargo trailer is shown. The distance DP is the horizontal distance between the centerlines of the vertical rows of holes in the outer plates 20. The distance DL is the horizontal distance between the centerlines of the vertical rows of holes in the liner panels 26. The distance DL is less than the distance DP such that the liner panel 26, which is of thinner material than the outer plate 20, is stretched when the fasteners are used to connect the liner panel 26 to the thin posts 22 and outer plates 20. The stretching of the panel prevents the liner panel from buckling.

As can also be seen in FIG. 7, the overlapping joint 21 of the outer plates contains a vertical row of holes. This vertical row of holes is aligned with the vertical row of holes in the thin posts and also the liner panels. The fasteners then connect the liner panels, thin posts and both outer plates together in a simple operation.

The bottom of the inside walls 16 and 18 are comprised of a wear band 36 as shown in FIG. 1. The wear band is made of a lightweight metal, such as aluminum and is approximately 10 inches tall and approximately 3/16-inch thick. The wear band, however, can be of varying height. The liner 26 laps behind the wear band 36 approximately 4-inches, but is above the bottom rail of the outer plate 20 rivet line, and extends to the just below the top rail extrusion on the top of the side walls 16 and 18, exposing the fasteners used to connect the top rail extrusion to the outer plates 20. The liner 26 is fastened to the wear band 36 between the thin posts 22. The liner 26 thus starts above the bottom rail of the thin walls 16 and 18 and ends just below the top rail so that the side wall rivets are not covered up and can be squeezed into the side walls unobstructed by the liner 26. During the same squeezing process for the rivets, the rivets for fastening the thin posts 22 to the outer plates 20 are squeezed into place with the liner 26 also in place, resulting in the liner 26 attached to the wall without an additional squeezing process.

Also, it should be noted that the flange portion 25 of the thin post 22 provides a support or backing for liner 26 but is bent inwardly slightly (toward plate 20) to avoid a sharp edge that might damage the thin panel 26 upon impact or flexing force from the interior of the trailer. Additionally, this s-shaped bend in the flange reinforces the area directly adjacent to the overlap of the thin post flange and the liner panel flange. This added reinforcement helps to reduce damage to the liner when a forklift or cargo container collides with the liner in this area. This s-shaped bend also helps to prevent the liner plate from buckling due to the outward force it exerts on the liner plate.

Referring now to FIGS. 4 and 5, the space between plate 20 and liner 26 can be filled with structural insulator panels 38. The structural insulator 38 can be glued to the inside of liner 26 and is used to prevent the liner from flexing and bending inward toward plate 20 and assists in structurally supporting the liner 26 on the outer plate 20. Styrofoam is used in the preferred embodiment, but any other lightweight material, such as polyurethane, can be used to fill the space between liner 26 and outer plate 20 to prevent the liner from bending inward.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A cargo trailer having thin walls comprising:
    a plurality of adjacent outer plates having regularly spaced vertical rows of holes;
    a plurality of thin posts regularly spaced along the inside of the outer plates, the thin posts consisting of generally hat-shaped plates in cross section having flanges on each edge with a row of holes along each said flange matching the rows of holes in said outer plates;
    a plurality of liner panels with a liner panel positioned between each pair of said thin posts, the liner panels being generally u-shaped in cross section with flanges on each edge of the u-shape overlapping said post flanges, a row of holes, along each said liner panel flange "containing first and second holes of different diameters along a length" matching the rows of holes in said outer plates and thin post flanges; and
    fasteners passing through each of the holes in said outer plates, thin post flanges and liner panel flanges for connecting the outer plates and liner panels to said posts.
2. The cargo trailer having thin walls of claim 1 wherein the fastening means are rivets.
3. The cargo trailer having thin walls of claim 1 wherein the space between said outer plates and said liner panels contains a structural insulator.
4. The cargo trailer having thin walls of claim 3 wherein said structural insulator comprises styrofoam boards.
5. The cargo trailer having thin walls of claim 3 wherein said structural insulator comprises polyurethane.
6. The cargo trailer having thin walls of claim 1 wherein said adjacent outer plates overlap each other at each edge.
7. The cargo trailer having thin walls of claim 1 wherein said thin post flanges contain s-shaped bends protruding inward providing backing for said liner panels.
8. The cargo trailer having thin walls of claim 1 wherein the horizontal distance between the row of holes in the flanges at each edge of the liner panels is less than the horizontal distance between the vertical rows of holes in the outer plates.
9. The cargo trailer having thin walls of claim 8 wherein the liner panels are stretched when the liner panels are connected by said fasteners to the thin posts and outer plates.
10. A cargo trailer having thin walls comprising:
    a plurality of adjacent overlapping outer plates having vertical rows of holes;
    a plurality of thin posts regularly spaced along the inside of the outer plates, the thin posts consisting of generally hat-shaped plates in cross section having flanges on each edge with a row of holes along each said flange matching the rows of holes in said outer plates, the flanges containing an s-shaped bend protruding inward;
    a plurality of liner panels with a liner panel positioned between each pair of said thin posts, the liner panels being generally u-shaped in cross section with flanges on each edge of the u-shape overlapping said thin post flanges and said s-shaped bend, a row of holes along each said liner panel flange matching the rows of holes in said outer plates and thin post flanges, the distance between the row of holes along each said liner panel flange being less than the distance between the regularly spaced vertical row of holes in the outer plates; and
    fasteners passing through each of the holes in said outer plates, thin post flanges and liner panel flanges for connecting the outer plates and liner panels to said posts, the liner panels being stretched horizontally when the fasteners connect the liner panels to the thin posts and outer plates.
11. The cargo trailer having thin walls of claim 10 wherein the fastening means are rivets.
12. The cargo trailer having thin walls of claim 10 wherein the space between said outer plates and said liner panels contains a structural insulator.
13. The cargo trailer having thin walls of claim 12 wherein said structural insulator comprises styrofoam boards.
14. The cargo trailer having thin walls of claim 13 wherein said structural insulator comprises polyurethane.
15. A cargo trailer having thin walls comprising:
    a plurality of adjacent outer plates having vertical rows of holes;
    a plurality of thin posts regularly spaced along the inside of the outer plates, the thin posts consisting of generally u-shaped plates in cross section with flanges on each edge and a row of holes on each flange;
    a plurality of liner panels between said thin posts, the liner panels generally u-shaped in cross section with flanges on each edges, the liner panel flanges containing first and second holes of different diameters along a length, said first holes equal in diameter to said holes in said thin posts and said outer plates, the horizontal distance between at least the first holes in the flanges of the liner panels being less than the horizontal distance between the vertical rows of holes in the outer plates; and fastener means to fasten said liner panels and thin posts to said outer plates, the fasteners only engaging said liner panels at said first holes along the liner panel flange, the liner panels being stretched when the fasteners connect the liner panels to said thin posts and said outer plates.

16. The cargo trailer having thin walls of claim 15 wherein the fastening means are rivets.

17. The cargo trailer having thin walls of claim 15 wherein the space between said outer plates and said liner panels contains a structural insulator.

18. The cargo trailer having thin walls of claim 17 wherein said structural insulator comprises styrofoam boards.

19. The cargo trailer having thin walls of claim 17 wherein said structural insulator comprises polyurethane.

20. The cargo trailer having thin walls of claim 15 wherein said adjacent plates overlap each other at each edge.

21. The cargo trailer having thin walls of claim 15 wherein said thin post flanges contain s-shaped bends protruding inward providing backing for said liner panels.

22. A cargo trailer having thin walls comprising a plurality of adjacent outer plates;
   a plurality of thin posts regularly spaced along the inside of the outer plates, the thin posts consisting of generally u-shaped plates in cross section with flanges on each edge of the u-shape and with first holes regularly spaced along the flanges;
   a plurality of liner panels between said thin posts, the liner panels being generally u-shaped u-shaped in cross-section with flanges on each edge of the u-shape, the liner panel flanges containing first and second holes of different diameters along the length, said first holes being equal in diameter to said first holes in said flanges of said thin posts; and
   fastener means to fasten said liner panels and posts to said outer plates, the fasteners only engaging said liner panel at said first holes along the flange.

23. The cargo trailer having thin walls of claim 22 wherein the fastening means are rivets.

24. The cargo trailer having thin walls of claim 22 wherein said rivets, said first holes in said thin post flanges and said first holes in said liner panel flanges are 3/16 inch diameter.

25. The cargo trailer having thin walls of claim 24 wherein said second holes in said liner panel which do not engage with the rivets are 3/8-inch diameter.

26. The cargo trailer having thin walls of claim 22 wherein said first holes in said thin posts and said first and second holes in said liner panel are two inches on center.

27. The cargo trailer having thin walls of claim 22 wherein said thin posts are two feet on center in low stress areas.

28. The cargo trailer having thin walls of claim 22 wherein said thin posts are one foot on center in high stress areas.

29. The cargo trailer having thin walls of claim 22 wherein said liner panels are substantially 0.019 inches thick.

30. The cargo trailer having thin walls of claim 29 wherein some additional said liner panels are substantially 0.035 inches thick.

31. The cargo trailer having thin walls of claim 22 comprising a wear band along the bottom of the thin walls.

32. The cargo trailer having thin walls of claim 31 wherein the liner panel laps behind the wear band.

33. The cargo trailer having thin walls of claim 32 wherein the liner panel laps 4 inches behind the wear band.

34. The cargo trailer having thin walls of claim 32 wherein said wear band is substantially 10 inches tall.

35. The cargo trailer having thin walls of claim 22 wherein the space between said outer plates and said liner panels contains a structural insulator.

36. The cargo trailer having thin walls of claim 35 wherein the structural insulator is styrofoam.

37. The cargo trailer having thin walls of claim 35 wherein the structural insulator is polyurethane.

38. The cargo trailer having thin walls of claim 22 wherein said adjacent outer plates overlap each other on one end.

39. A cargo trailer having thin walls comprising a plurality of generally rectangular overlapping plates, the overlapping plates containing first holes in vertical rows spaced regularly along the length of the trailer and said first holes being spaced regularly vertically;
   a plurality of thin posts regularly spaced along the inside of the overlapping plates, the thin posts consisting of generally rectangular shaped plates having a generally u-shaped cross-section with flanges on each edge of the u-shape, the flanges containing first holes of an equal diameter along their length;
   a plurality of liner panels between said thin posts on the inside of the overlapping plates, the liner panels being of a generally rectangular shape having a generally u-shaped cross-section with flanges on each edge of the u-shape, the flanges containing first and second holes spaced along the length of the flange, said first holes in said liner panels being equal in diameter to said first holes in said thin posts and said overlapping plates;
   fastener means to fasten said liner panels and said thin posts to said overlapping plates, said fastener means only engaging said liner panels at said first holes.

40. A cargo trailer having thin walls comprising a plurality of adjacent outer plates having vertical rows of holes;
   a plurality of thin posts regularly spaced along the inside of the outer plates, the thin posts consisting of generally hat-shaped plates in cross section having flanges on each edge with a row of holes along each said flange matching the rows of holes in said outer plates;
   a plurality of liner panels with a liner panel positioned between each pair of said thin posts, the liner panels being generally u-shaped in cross section with flanges on each edge of the u-shape overlapping said post flanges, each said flange on said liner panel having holes spaced along the flange length; and
   fasteners passing through each of the holes in said outer plates and post flanges for connecting the outer plates to said posts, some of said diagnosis but less than all of said fasteners also passing through said holes in said liner panels for connecting said liner panels to said posts.

41. The cargo trailer having thin walls of claim 40 wherein said fasteners are rivets.

42. The cargo trailer having thin walls of claim 40 wherein the balance of said fasteners that do not pass through said holes in each said liner panel do not engage said liner panels.

43. The cargo trailer having thin walls of claim 42 wherein said fasteners that do not engage said liner panels pass through additional openings in said liner panels that are aligned with some of the holes in said posts and flanges, said additional openings being larger than said fasteners.

44. The cargo trailer having thin walls of claim 40 wherein the space between said outer plates and said liner panels contains a structural insulator.

45. The cargo trailer having thin walls of claim 40 wherein said adjacent outer plates overlap each other at each edge.

* * * * *